April 20, 1971  R. E. BAKER ET AL  3,575,786

SHIELD INTERLAYER FOR SPALL SUPPRESSION

Filed Dec. 26, 1968

INVENTORS
RONALD E. BAKER
RICHARD L. COOK
EDWIN C. SLAGEL

BY: Oldham & Oldham

ATTORNEYS

United States Patent Office 3,575,786
Patented Apr. 20, 1971

3,575,786
SHIELD INTERLAYER FOR SPALL SUPPRESSION
Ronald E. Baker, Phoenix, Richard L. Cook, Flagstaff, and Edwin C. Slagel, Phoenix, Ariz., assignors to Goodyear Aerospace Corporation, Akron, Ohio
Filed Dec. 26, 1968, Ser. No. 786,870
Int. Cl. B32b 5/04; B64c 1/12
U.S. Cl. 161—165                                        4 Claims

ABSTRACT OF THE DISCLOSURE

A dual layer composite laminate consisting of ballistic nylon felt with a peripheral seal coat and a urethane elastomer, bonded to the internal surface of a wall, floor, or other part of vehicle structure. The felt side is placed against the structure, to be protected, and the urethane side is exposed. The nylon felt is an efficient fragment catcher, and also provides stand-off which allows the cone of spall to expand and be suppressed instead of following the projectile directly through the wound. The urethane elastomer surface is highly restrictive and tear resistant. It constricts the spall pattern and keeps the felt from spreading excessively as a projectile passes through.

---

An extremely hazardous situation exists because of flying debris caused by ballistic damage to aircraft structure. The flying debris is classified as spall. This is extremely hazardous to helicopter crews, for example or any occupants within a vehicle which does not utilize some type of armour shield or protection. The purpose of the invention is to control the spall generated by bullets or projectiles passing through such structure. The shield of the invention greatly reduces or eliminates this spalling effect, and what little debris passes through the shield travels in a path close to that of the bullet.

The general object of the invention is to provide a shield with spall suppression qualities by an interlayer composite laminate which is relatively inexpensive, yet highly effective to control debris or spall from projectiles passing through a shield.

The aforesaid objects of the invention and other objects which will become apparent as the description proceeds are achieved by providing a laminated composite to control the spall of projectiles passing through a protective shield which comprises a nylon felt layer adjacent the internal surface of the shield, and an urethane elastomer layer or pad bonded to the surface of the felt layer.

Figure 1:
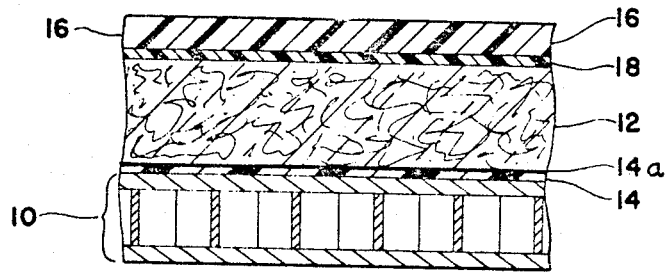
Figure 2:
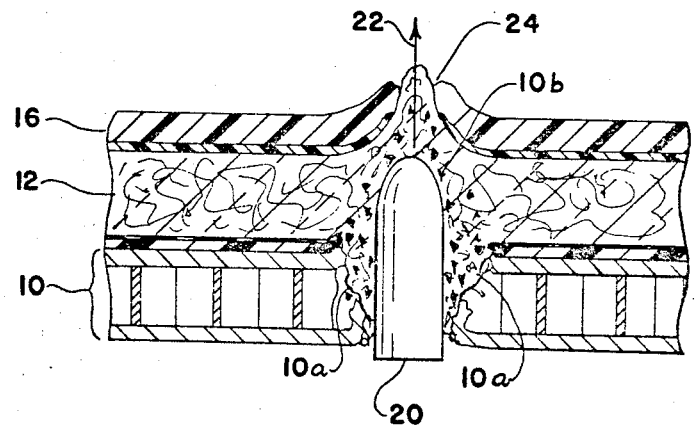

For a better understanding of the invention reference should be made to the accompanying drawings wherein:

FIG. 1 is an enlarged cross-sectional illustration of the improved laminate of the invention; and FIG. 2 is an enlarged broken away cross-sectional illustration of the laminate of the invention showing its spall absorbing properties upon the penetration of the bullet or projectile into the shield.

With reference to the form of the invention illustrated in the drawings, the numeral 10 indicates generally the skin or other structure of an aircraft in this instance made from a metal honeycomb. The skin 10 is preferably designed to be compatible with the environmental requirements, such as weight, thickness, structural strength, etc., of the carrying vehicle or structure. However, projectiles will readily pass through this structure, and in the past this has caused a scatter-gun effect within the aircraft. It is for the purpose of defeating a scatter-gun effect that the invention was conceived.

The invention comprises a fragment protection for the internal surface of the skin or structure 10, and essentially constitutes a felt layer 12 bonded thereto with a suitable bonding adhesive layer 14 with a seal coat 14a encompassing the nylon felt so as to enclose it and prevent moisture absorption. The layer 12 is usually a nylon felt and preferably a ballistic nylon felt made to the proper specification by the Quartermaster Research & Engineering Institute, a government facility operating in Massachusetts. Preferably, the felt will be of a density of at least .2 lb./sq. ft., again depending upon the environmental situation for the material. It should be understood, however, that other more rigid materials may perform better for flooring applications where cargo sliding is involved. Any material which has the ability to act as an efficient fragment catcher by high elongation and deformation before failure to permit absorption of kinetic energy will meet the objects of the invention.

The invention is completed by a urethane elastomer layer 16 bonded to the surface of the felt layer 12 by a suitable bonding layer 18. The urethane layer is designed to be tear resistant and sufficiently elastic to close over a puncture wound. It exerts an influence of restricting the spall pattern and keeping the felt layer 12 from spreading excessively as the projectile passes therethrough. It is also a waterproof non-skid surface and highly abrasive resistant flooring material. Specifically, it is believed that the composite layers might be made from a combination of materials in general proportional range as follows:

(1) (a) Urethane
    (b) Polyurethane Foam
(2) (a) Urethane Foam 2# or less
    (b) Polystyrene
(3) (a) Urethane
    (b) Ballistic Felt 18–20 oz.
(4) (a) Urethane
    (b) 4–8# Rigid Urethane Foam
(5) (a) Urethane
    (b) Balsa Wood
(6) (a) Urethane
    (b) Honeycomb Paper, Glass, Metal
(7) (a) Urethane
    (b) Suppressant Foam Layer The elastomer layer 16 must have minimum physical characteristics of 400 p.s.i. minimum tear resistance, 400% elongation without failure and 6000 p.s.i. minimum tensile strength.

FIG. 2 illustrates the type of action that occurs upon pentration of a bullet 20 through the skin 10. Particularly, it should be noted that a portion of the skin 10 at 10a has spalled into a plurality of small pieces, each indicated generally by numeral 10b.

However, the snagging properties of the ballistic nylon felt layer 12 has caught and absorbed most of these fragments 10b, even though the force of the projectile directed in the direction of arrow 22 has caused a rupture of the urethane elastomer layer 16 at 24. Actual tests run with this type of device show that the nylon felt allows the larger fragments to penetrate grouped together with smaller debris diverging and being snagged by the minute filaments of the felt blanket. Hence, extremely efficient spall of fragment suppression is accomplished by the combination of the nylon felt layer 12 with the urethane elastomer layer 16. The cone of diverging debris is referred to as a spall cone.

It should be noted that the nylon felt layer 12 is greater than the thickness of the urethane elastomer layer 16 in order to provide sufficient stand-off for spall cone divergence. Preferably, the urethane elastomer layer will be at least about .050 inch in thickness and not more than .50 inch in thickness, but of course this will depend upon the ballistic requirements of the total laminate. It has also been found that what little debris may pass through the hole 24 in the elastomer layer 16 will travel in a path close to that of the bullet, will be contained in spall cone of small angle.

While in accordance with the patent statutes only the best known embodiment of the invention has been illustrated and described in detail, it is to be particularly understood that the invention is not limited thereto or thereby, but that the inventive scope is defined in the appended claims.

What is claimed is:

1. A laminated composite to control the spall of projectiles passing through a protective shield which comprises a nylon felt layer adjacent the internal surface of the shield, a urethane elastomer layer bonded over its entire surface area to the entire surface of the felt layer, said felt layer being at least twice the thickness of the elastomer layer, and where the elastomer layer has the physical characteristics of 400 p.s.i. minimum tear strength, 400% elongation without failure, and 6,000 p.s.i. minimum tensile strength.

2. A laminated composite according to claim 7 where the felt has properties of high elongation and penetration absorption, and the elastomer layer has properties of high elasticity and resistant to tear.

3. A laminated composite according to claim 2 where the felt is .2 lb./sq. ft. and is a ballistic nylon felt, and the urethane elastomer is waterproof and highly abrasive resistant.

4. A laminate according to claim 3 where the felt layer with sealer is bonded to the member, and the elastomer layer is between .100 inch to .500 inch in thickness.

References Cited

UNITED STATES PATENTS

| | | | |
|---|---|---|---|
| 1,513,766 | 11/1924 | Spooner | 2—2.5X |
| 2,758,952 | 8/1956 | Toulmin | 161—92X |
| 3,292,181 | 12/1966 | Kennedy et al. | 2—2.5 |
| 3,320,619 | 5/1967 | Lastnik et al. | 161—404X |
| 3,486,966 | 12/1969 | Allen et al. | 161—92X |

ROBERT F. BURNETT, Primary Examiner

R. L. MAY, Assistant Examiner

U.S. Cl. X.R.

161—190, 404; 244—121